United States Patent
Oyama

(10) Patent No.: US 10,158,410 B2
(45) Date of Patent: Dec. 18, 2018

(54) BASE STATION, WIRELESS COMMUNICATION SYSTEM, AND WIRELESS COMMUNICATION METHOD USING TRANSMISSION WEIGHT PATTERNS

(71) Applicant: FUJITSU LIMITED, Kawasaki-shi, Kanagawa (JP)

(72) Inventor: Teppei Oyama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 18 days.

(21) Appl. No.: 15/362,399

(22) Filed: Nov. 28, 2016

(65) Prior Publication Data
US 2017/0155438 A1    Jun. 1, 2017

(30) Foreign Application Priority Data
Dec. 1, 2015 (JP) ................................. 2015-234777

(51) Int. Cl.
*H04B 7/06* (2006.01)
*H04L 5/00* (2006.01)
(Continued)

(52) U.S. Cl.
CPC ......... *H04B 7/0617* (2013.01); *H04B 7/0452* (2013.01); *H04L 5/0048* (2013.01); *H04W 88/12* (2013.01)

(58) Field of Classification Search
CPC .. H04B 7/0452; H04B 7/0617; H04B 7/0619; H04B 7/0621; H04B 7/0626;
(Continued)

(56) References Cited

U.S. PATENT DOCUMENTS

2006/0245512 A1* 11/2006 Rha .................. H04B 7/0617
                                                          375/267
2010/0254466 A1* 10/2010 Wang ................ H04B 7/0491
                                                          375/259
(Continued)

FOREIGN PATENT DOCUMENTS

EP        2134003        12/2009
EP        2575274        4/2013
(Continued)

OTHER PUBLICATIONS

M. J. D. Powell, "A view of algorithms for optimization without derivatives," Cambridge University Technical Report DAMTP 2007/NA03, Apr. 2007 (12 pages).

*Primary Examiner* — Hoang-Chuong Q Vu
(74) *Attorney, Agent, or Firm* — Fujitsu Patent Center

(57) ABSTRACT

A base station including: a memory, a processor coupled to the memory and the processor configured to: determine, less frequently than transmission opportunities, a specified number of transmission weight patterns based on channel characteristics between the base station and a plurality of wireless terminals, each of the transmission weight patterns indicating transmission weights used when the base station transmits a wireless signal to target wireless terminals selected from the plurality of the wireless terminals in one of the transmission opportunities, select, for each transmission opportunity of the transmission opportunities, a transmission weight pattern from the specified number of the transmission weight patterns based on channel characteristics between the base station and the target wireless terminals of the transmission opportunity, and transmit the wireless signal based on the selected transmission weight pattern.

8 Claims, 11 Drawing Sheets

TRANSMISSION POINT

(51) Int. Cl.
*H04B 7/04* (2017.01)
*H04B 7/0452* (2017.01)
*H04W 88/12* (2009.01)

(58) Field of Classification Search
CPC ... H04B 7/0632; H04B 7/0634; H04L 5/0048; H04W 88/12
See application file for complete search history.

(56) References Cited

U.S. PATENT DOCUMENTS

| | | | | |
|---|---|---|---|---|
| 2011/0218007 | A1* | 9/2011 | Kimura | H04W 72/082 |
| | | | | 455/512 |
| 2013/0034187 | A1* | 2/2013 | Taoka | H04B 7/024 |
| | | | | 375/296 |
| 2013/0076566 | A1* | 3/2013 | Jiang | H01Q 1/246 |
| | | | | 342/373 |
| 2013/0272257 | A1* | 10/2013 | Takaoka | H04W 52/42 |
| | | | | 370/329 |
| 2016/0309478 | A1* | 10/2016 | Nabetani | H04B 7/0697 |
| 2017/0085302 | A1* | 3/2017 | Tong | H04B 7/0478 |

FOREIGN PATENT DOCUMENTS

| | | |
|---|---|---|
| JP | 2009-296598 | 12/2009 |
| JP | 2013-74629 | 4/2013 |
| JP | 2013-229727 | 11/2013 |

* cited by examiner

TRANSMISSION POINT

BASE STATION, WIRELESS COMMUNICATION SYSTEM, AND WIRELESS COMMUNICATION METHOD USING TRANSMISSION WEIGHT PATTERNS

CROSS-REFERENCE TO RELATED APPLICATION

This application is based upon and claims the benefit of priority of the prior Japanese Patent Application No. 2015-234777, filed on Dec. 1, 2015, the entire contents of which are incorporated herein by reference.

FIELD

A technology described herein is related to a base station, a wireless communication system, and a wireless communication method.

BACKGROUND

In recent years, the mobile traffic continues to increase due to the spread of smart phones or the like. In view of the above circumstance, it has been examined to increase cell capacity by introducing beamforming or multi-user multiple-input and multiple-output (MIMO).

"Beamforming" is an example of techniques in which a transmission signal is weighted to direct a transmission beam in a specific direction. Also, "multi-user MIMO" is an example of techniques in which signals addressed to a plurality of users are multiplexed and are simultaneously transmitted.

Japanese Laid-open Patent Publication No. 2013-229727, Japanese Laid-open Patent Publication No. 2013-74629, and Japanese Laid-open Patent Publication No. 2009-296598 discuss related art.

M. J. D. Powell, "A view of algorithms for optimization without derivatives," Cambridge University Technical Report DAMTP 2007, April, 2007, also discusses related art.

SUMMARY

According to an aspect of the invention, a base station includes a memory, a processor coupled to the memory and the processor configured to: determine, less frequently than transmission opportunities, a specified number of transmission weight patterns based on channel characteristics between the base station and a plurality of wireless terminals, each of the transmission weight patterns indicating transmission weights used when the base station transmits a wireless signal to target wireless terminals selected from the plurality of the wireless terminals in one of the transmission opportunities, select, for each transmission opportunity of the transmission opportunities, a transmission weight pattern from the specified number of the transmission weight patterns based on channel characteristics between the base station and the target wireless terminals of the transmission opportunity, and transmit the wireless signal based on the selected transmission weight pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
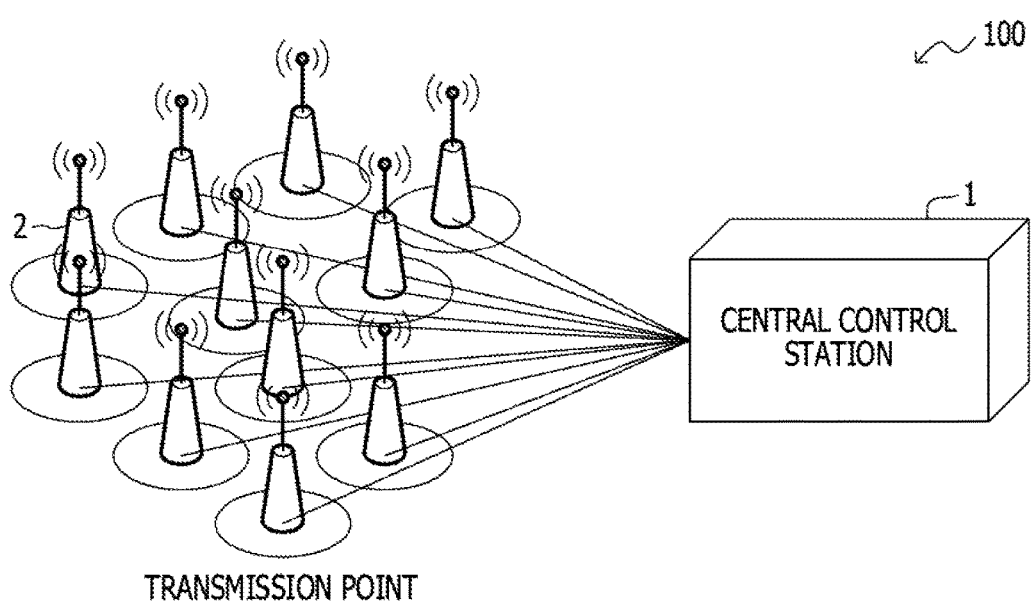
FIG. 1 is a view illustrating a configuration example of a communication system according to an embodiment.

In a multi-user MIMO, in weighting signals addressed to a plurality of users and thus multiplexing the signals, for example, if the users that are destinations to which the multiplexed signals are addressed and weights are calculated, a processing amount might be increased.

A combination of signal multiplexing where the number of users is $N_{ue}$ and multiplicity is $N_{tx}$ is $N_{comb}(N_{ue}, N_{tx})$ and, if the combination of signal multiplexing and a transmission weight are determined for each scheduling, a processing time becomes enormous. For example, when $N_{ue}=14$ and $N_{tx}=5$, a combination of users that are to be multiplexes and a transmission weight are searched for from 2002 combinations.

According to one aspect, it is an object of a technology described herein to reduce a transmission processing amount of a base station that communicates with a plurality of wireless terminals.

An embodiment will be described below with reference to the accompanying drawings. However, the embodiment described below is merely an example and there is no intention to exclude various modifications and applications of techniques that are not described explicitly in the following embodiment. That is, the embodiment may be modified in various ways and thus implemented within the scope of the embodiment without departing from the gist thereof.

Also, each of the drawings is given not for the purpose of limiting component elements according to the present disclosure only to those illustrated therein, and a configuration according to the present disclosure may include other component elements. In the drawings used in the following embodiment, each part denoted by the same reference character represents the same or similar part, unless specifically stated otherwise.

[A] Embodiment

[A-1] System Configuration Example

FIG. 1 is a view illustrating a configuration example of a communication system according to an embodiment.

A communication system 100 may illustratively include a central control station 1, a plurality of transmission points 2, and a plurality of terminals 3 (which will be described later with reference to FIG. 2 and FIG. 3).

The central control station 1 is illustratively coupled to the plurality of terminals 3 via the plurality of transmission points 2 in wireless manner so as to be communicable. The "central control station" may be also referred to as a "base station".

Although, in the example illustrated in FIG. 1, the communication system 100 includes a single central control station 1, the number of central control stations 1 of the communication system 100 may be variously changed.

Each of the transmission points 2 is an example of a wireless device coupled to the base station 1 in a wired or wireless manner, and may be illustratively referred to as a remote radio equipment (RRE). Note that the "transmission point" may be also referred to as a "transmission station". Each of the transmission points 2 illustratively corresponds to a block of a modulation and demodulation function and a wireless function, separated from the base station 1, and might be installed in a remote location for the base station 1.

Therefore, each of the transmission points 2 may be coupled to the central control station 1 in a wired (for example, via an optical fiber or the like) or wireless manner so as to be communicable. It may be understood that each of the transmission points 2 is a part of the base station 1 equipment and also that each of the transmission points 2 corresponds to some other base station than the base station 1.

Also, each of the transmission points 2 may illustratively include a reception antenna 21 and a transmission antenna 22 which will be described later with reference to FIG. 2, and a wireless communication with the corresponding terminal 3 via the reception antenna 21 and the transmission antenna 22 may be possible.

For example, each of the transmission points 2 may form a wireless area (which may be also referred to as a "coverage") in which a wireless communication with the corresponding terminal 3 is possible. The wireless area may be also referred to as a "cell" or a "sector". The "cell" may be also referred to as a microcell, a femtocell, a picocell, or the like, depending on the size of the coverage.

Each of the transmission points 2 is capable of changing the spatial shape (which may be also referred to as "directivity") of the wireless area formed by the transmission point 2, for example, by beamforming in accordance with control of the central control station 1. For example, a transmission beam may be directed to a specific one of the terminals 3 and, in order not to cause interference with the specific terminal 3, a transmission beam may be directed to a direction in which the transmission beam avoids the specific terminal 3.

Note that, although, in the example illustrated in FIG. 1, the communication system 100 includes eleven transmission points 2, the number of the transmission points 2 of the communication system 100 may be variously changed. Note that, in FIG. 1, a reference character "2" is given to only one of transmission points and illustration of the reference character for each of the other transmission points is omitted.

Figure 2:
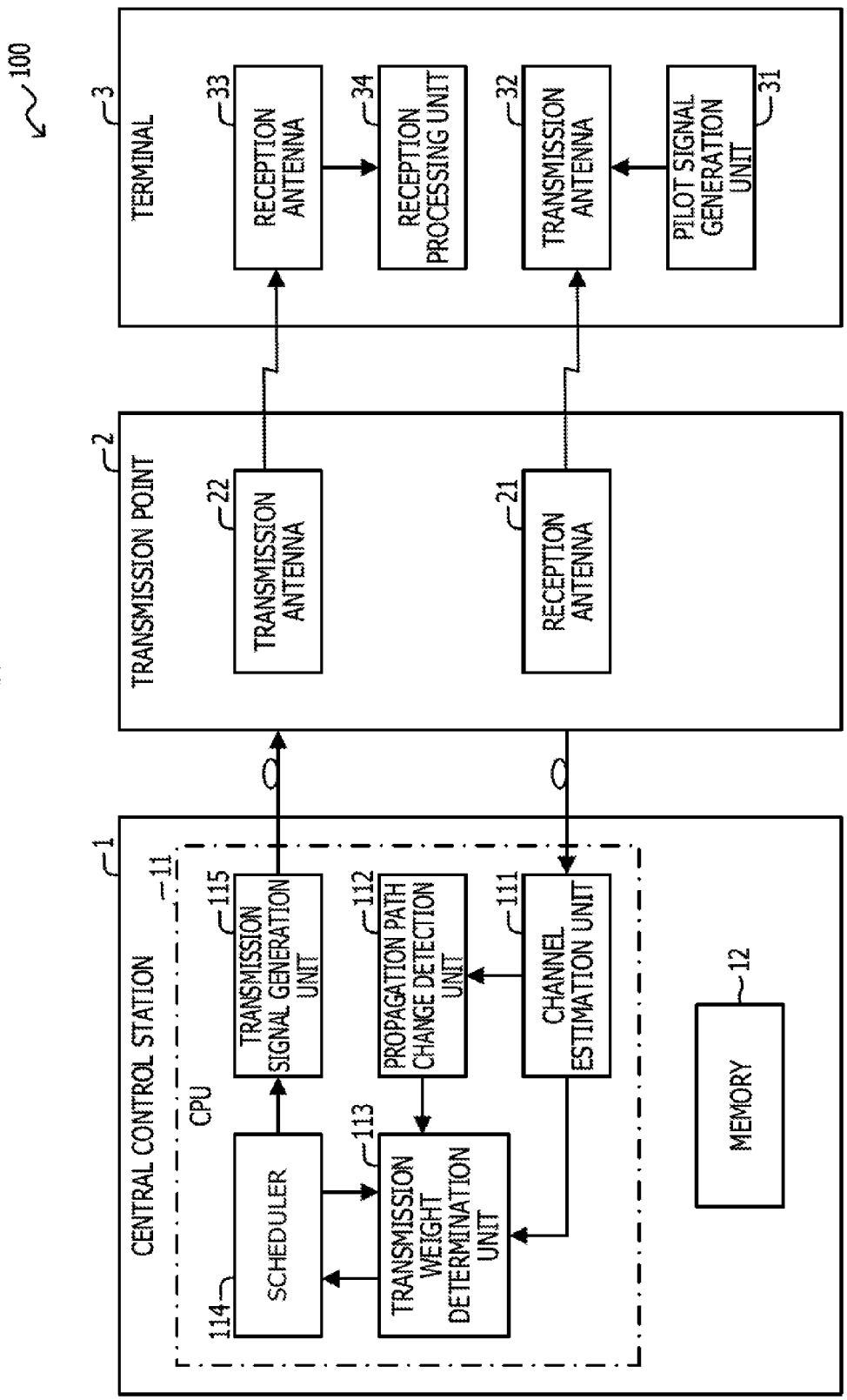
FIG. 2 is a block diagram illustrating a functional configuration example of the communication system according to the embodiment.

FIG. 2 is a block diagram illustrating a functional configuration example of the communication system according to the embodiment.

Each of the terminals 3 may illustratively include a pilot signal generation unit 31, a transmission antenna 32, a reception antenna 33, and a reception processing unit 34. The "terminal" is an example of a wireless device.

The pilot signal generation unit 31 illustratively generates a pilot signal that is transmitted to the central control station 1 via the corresponding transmission point 2. The pilot signal may be used for estimating a propagation vector (or channel vector, which will be described later) in the central control station 1.

The transmission antenna 32 illustratively transmits the pilot signal generated by the pilot signal generation unit 31 to the corresponding transmission point 2.

The reception antenna 33 illustratively receives a signal transmitted from the corresponding transmission point 2.

The reception processing unit 34 illustratively performs various types processing, such as demodulation, decoding, or the like, on the signal received by the reception antenna 33 and acquires reception data.

Each of the transmission points 2 illustratively includes the reception antenna 21 and the transmission antenna 22.

The reception antenna 21 illustratively receives the pilot signal transmitted from the corresponding terminal 3 via a wireless communication. Note that the number of the reception antennas 21 of the transmission point 2 may be variously changed.

The transmission antenna 22 illustratively transmits a transmission signal generated by the central control station 1 to the corresponding terminal 3 via a wireless communication. Note that the number of the transmission antennas 22 of the transmission point 2 may be variously changed.

The central control station 1 may illustratively include a central processing unit (CPU) 11 and memory 12.

The memory 12 may be illustratively a storage device including read only memory (ROM) and random access memory (RAM). A program, such as a basic input/output system (BIOS) or the like, may be written in the ROM. Also, the RAM may be used as primary recording memory or working memory of the CPU 11.

The CPU 11 is illustratively a processing device that performs various controls and operations and executes the program stored in the memory 12 to realize various functions. For example, as illustrated in FIG. 1, the CPU 11 may function as a channel estimation unit 111, a propagation path change detection unit 112, a transmission weight determination unit 113, a scheduler 114, and a transmission signal generation unit 115.

Note that the program that causes realization of functions as the channel estimation unit 111, the propagation path change detection unit 112, the transmission weight determination unit 113, the scheduler 114, and the transmission signal generation unit 115 may be provided in a form recorded in a recording medium. The recording medium may be, for example, a flexible disk, a CD, a Blu-ray Disc, a magnetic disk, an optical disk, a magneto-optical disk, or the like, and is computer readable. The CD may be CD-ROM, CD-R, CD-RW, or the like, and the DVD may be DVD-ROM, DVD-RAM, DVD-R, DVD+R, DVD-RW, DVD+RW, HD DVD, or the like. A computer (the CPU 11 in this embodiment) may be configured to read the program from the above-described recoding medium via a reading device (not illustrated), transfer the program to an internal recording device or an external recording device, store the program therein, and use the program. Also, the program may be recorded in a storage device (the recording medium), such as, for example, a magnetic disk, an optical disk, a magneto-optical disk, or the like in advance and provided to the computer from the storage device via a communication path.

In realizing functions as the channel estimation unit 111, the propagation path change detection unit 112, the transmission weight determination unit 113, the scheduler 114, and the transmission signal generation unit 115, the program stored in the internal storage device may be executed by the computer. In this embodiment, the "internal storage device" may be the memory 12 and the "computer" may be the CPU 11. Also, the computer may read the program recorded in the recording medium and execute the program.

The CPU 11 illustratively controls an operation of the entire central control station 1. A device that controls the operation of the entire central control station 1 is not limited to the CPU 11. The device that controls the operation of the entire central control station 1 may be, for example, one of a micro processing unit (MPU) and a digital signal processor (DSP). Also, the device that controls the operation of the entire central control station 1 may be, for example, one of an application specific integrated circuit (ASIC), a programmable logic device (PLD), a field programmable gate array (FPGA). Furthermore, the device that controls the operation of the entire central control station 1 may be a combination of two or more of a CPU, a MPU, a DSP, an ASIC, a PLD, and FPGA.

Figure 3:
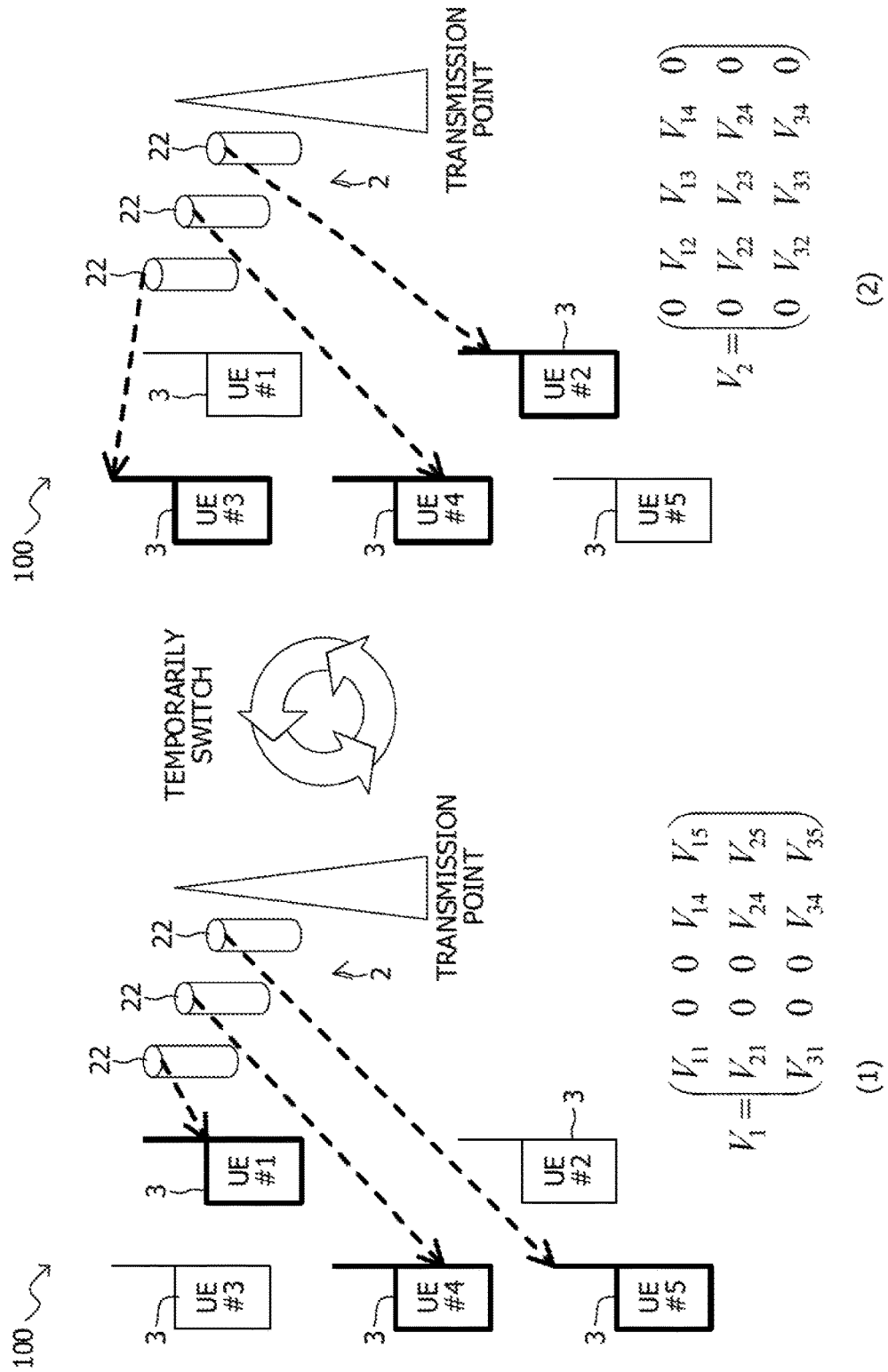
FIG. 3 is a diagram illustrating an outline of wireless resource scheduling in the communication system according to the embodiment.

FIG. 3 is a diagram illustrating an outline of a wireless resource scheduling in the communication system according to the embodiment.

As illustrated in (1) and (2) of FIG. 3, the central control station 1 may temporally switch the terminal 3 that is a transmission target to which a transmission signal is transmitted from one to another between the terminals 3.

In the example illustrated in (1) and (2) of FIG. 3, the communication system 100 includes five terminals 3 denoted by EU#1 to UE#5, and the transmission point 2 includes three transmission antennas 22. Note that in (1) and (2) of FIG. 3, illustration of the central control station 1 and the reception antenna 21 of the transmission point 2 is omitted.

The central control station 1 may perform beamforming on each of UE#1, UE#4, and UE#5 via the corresponding transmission antenna 22 of the transmission point 2 at a certain timing illustrated in (1) of FIG. 3.

In (1) of FIG. 3, a matrix $V_1$ indicates an example in which transmission weights $V_{11}$, $V_{21}$, and $V_{31}$ are applied to transmission signals to UE#1. Also, the matrix $V_1$ indicates an example in which transmission weights $V_{14}$, $V_{24}$, and $V_{34}$ are applied to transmission signals to UE#4 and transmission weights $V_{15}$, $V_{25}$, and $V_{35}$ are applied to transmission signals to UE#5. Furthermore, the matrix $V_1$ indicates an example in which a transmission weight 0 is applied to transmission signals to UE#2 and UE#3.

The central control station 1 may perform control in which transmission signals are transmitted to UE#2, UE#3, and UE#4 via the transmission antennas 22 of the transmission point 2 at a timing illustrated in (2) of FIG. 3, which is different from the timing illustrating in (1) of FIG. 3.

In (2) of FIG. 3, a matrix $V_2$ indicates an example in which transmission weights $V_{12}$, $V_{22}$, and $V_{32}$ are applied to transmission signals to UE#2, transmission weights $V_{13}$, $V_{23}$, and $V_{33}$ are applied to transmission signals to UE#3, and transmission weights $V_{14}$, $V_{24}$, and $V_{34}$ are applied to transmission signals to UE#4. Also, the matrix $V_2$ indicates an example in which a transmission weight 0 is applied to transmission signals to UE#1 and UE#5.

Each of the matrixes $V_1$ and $V_2$ illustrated in (1) and (2) of FIG. 3, respectively, may be also referred to as a "transmission pattern". The "transmission pattern" illustratively indicates a combination of the terminal 3 (in other words, a user) to which a multiple signal is transmitted and a transmission weight for each user. The "user to which a multiple signal is transmitted" might be referred to as "a multi-user" and "multiplexing a signal in order to transmit a signal to a plurality of users" might be referred to as "user multiplex" below.

Also, each of the transmission weights $V_{11}$ to $V_{35}$ illustrated in (1) and (2) of FIG. 3 may be also referred to as a "transmission weight" or a "weighting factor". Note that, although, in FIG. 3, only two transmission patterns are illustrated, the number of transmission patterns used in the communication system 100 may be variously changed.

The central control station 1 may store information related to a plurality of transmission patterns defined in advance, for example, in the memory 12. The central control station 1 may transmit transmission signals to the plurality of terminals 3 (in other words, the "users") while temporally switching a transmission pattern from one to another between the plurality of transmission patterns, based on scheduling performed by the scheduler 114, which will be described later.

A model of a reception signal that is received by the terminal 3 from the central control station 1 via the transmission point 2 is illustratively represented by Expression (1) below.

$$y_k = h_k^H v_{kn} x_k + \sum_{i=1}^{N_{ue}} h_k^H v_{in} x_i + n_k \quad (1)$$

$y_k$ is a signal that is received by a user k and $x_k$ is a transmission signal that is transmitted to the user k, $$h_k^H \in C^{1 \times N_{tx}}$$

indicates a propagation vector related to the user k, and $$v_{kn} \in C^{N_{tx} \times 1}$$

indicates a transmission weight vector in a transmission pattern n for a transmission component. The "transmission weight vector $v_{kn}$" might be referred to merely as a "transmission weight $v_k$" below. Also, $x_i$ indicates a transmission signal that is transmitted to a user i, which is a signal that interferes with the user k, $v_{in}$ indicates a transmission weight for an interference component in the transmission pattern n, and $n_k$ indicates an interference component from thermal noise and a transmission point (in other words, "a transmission point outside cooperation") that is not included in the model.

The channel estimation unit 111 is an example of an estimation unit and illustratively estimates a propagation vector expressed by $$h_k^H$$

from a pilot signal received from the terminal 3 via the transmission point 2. Also, the channel estimation unit 111 may input information related to the estimated propagation vector to the propagation path change detection unit 112 and the transmission weight determination unit 113.

The propagation path change detection unit 112 illustratively detects a propagation path change from the information related to the propagation vector, which has been input by the channel estimation unit 111. The propagation path change detection unit 112 may be configured to input, if a value that indicates a propagation path change is a threshold or more, an interrupt to the transmission weight determination unit 113. Thus, a situation where, because a change in transmission characteristic is small, even when a transmission weight that is obtained by calculation is not changed, recalculation of a transmission weight is caused to be performed does not occur, so that the processing amount and power consumption in the central control station 1 may be reduced.

The transmission weight determination unit 113 illustratively determines the transmission weight $v_k$, based on the propagation vector expressed by $$h_k^H$$

which has been input from the channel estimation unit 111. The transmission weight determination unit 113 may be configured to determine, with the input of the interrupt from the transmission weight determination unit 113 as a trigger, the transmission weight $v_k$. Also, the transmission weight determination unit 113 may be configured to determine the transmission weight $v_k$ by solving a proportional fairness (PF) utility optimization problem. The transmission weight that is determined by the transmission weight determination unit 113 may depend on a propagation path characteristic (or a channel characteristic) between the transmission point 2 and the terminal 3.

The PF utility optimization problem is illustratively solved in accordance with Expressions (2) to (6) below.

$$U = \sum_{k=1}^{N_{ue}} \log \left\{ \sum_{n=1}^{N_{pat}} f_n R_{kn} \right\} \quad (2)$$

Illustratively, U is an amount defined by the logarithmic sum of an average throughput of a user, and maximization of U is equivalent to PF scheduling. For example, at a different transmission opportunity, transmission pattern selection is performed by maximizing U, for example, such that the logarithmic sum of an expected throughput when transmission data is transmitted in the corresponding transmission pattern is increased. Thus, a wireless resource in the communication system 100 may be effectively used.

$N_{ue}$ indicates the number of users covered by transmission points that perform transmission in cooperation, $N_{pat}$ indicates the number of switching patterns that are prepared in advance, and $R_{kn}$ indicates an expected throughput achieved when the user k performs a communication using the transmission matrix of a pattern n. Also, $f_n$ indicates the ratio of a time resource or a frequency resource occupied by the pattern n when PF scheduling is performed (the details of the variable $f_n$ will be described later with reference to FIG. 4).

A throughput after PF scheduling may be illustratively calculated by solving the PF utility optimization problem represented by Expression (2) above, and a transmission weight with which the throughput after scheduling is high may be determined.

Expressions (3) to (6) below are examples of constraints for solving the PF utility optimization problem represented by Expression (2) above.

Expression (3) below illustratively indicates a throughput that is calculated from a signal-to-interference-plus-noise ratio (SINR) using the Shannon throughput.

$$R_{kn} = \log_2(1+\gamma_{kn}) \quad (3)$$

$\gamma_{kn}$ indicates SINR when the user k performs transmission using the transmission matrix of the pattern n, and $\sigma_k^2$ indicates noise.

Expression (4) below illustratively indicates SINR.

$$\gamma_{kn} = \frac{|h_k^H v_{kn}|^2}{\sigma_k^2 + \sum_{i=1, i \neq k}^{N_{ue}} |h_k^H v_{in}|^2} \quad (4)$$

Expression (5) below illustratively indicates that the total of respective resource ratios of patterns is 1.

$$\sum_{n=1}^{M_{pat}} f_n = 1 \quad (5)$$

Expression (6) below is illustratively an lth transmission power condition and indicates that the total sum of signal power transmitted from the plurality of transmission points 2 determined by $Q_{lk}$ is $q_l$.

$$\sum_{k=1}^{N_{ue}} v_{kn}^H Q_{lk} v_{kn} = q_l \quad (6)$$

The transmission weight determination unit 113 may be configured to calculate optimal transmission weights $v_{kn}$ and $v_{in}$ in each transmission pattern by solving the PF optimization problem for $f_n$ and $v_{in}$. In other words, the transmission weight determination unit 113 may be configured to determine a transmission pattern (in other words, "select a user") by calculating the optimal transmission weights $v_{kn}$ and $v_{in}$.

In this case, for example, when the user k is not multiplexed in the transmission pattern n, as illustrated in FIG. 3, the transmission weight $v_{kn}$ for a signal component for the user k is caused to be 0 vector by optimization of PF utility. In other words, as well as a transmission weight, a user that is to be multiplexed may be determined by performing PF utility optimization.

However, as for the PF utility optimization problem represented by Expressions (2) to (6) above, the number of variables of the transmission weights $v_{in}$ that exist corresponds to the number of users×the number of transmission points for each transmission pattern and, since each variable is a complex number, the PF utility optimization problem is solved for both of a real part and an imaginary part of each complex number. Thus, the calculation performed in the transmission weight determination unit 113 might be complicated.

Therefore, in order to reduce the number of variables in the PF utility optimization problem, Expressions (2) to (6) above may be illustratively replaced with Expressions (7) to

(13) below. Thus, the PF utility optimization problem may be replaced with an optimization problem for less variables.

$$U = \sum_{k=1}^{N_{ue}} \log\left\{\sum_{n=1}^{N_{pat}} f_n R_{kn}\right\} \quad (7)$$

$$R_{kn} = \log_2(1 + \gamma_{kn}) \quad (8)$$

$$\Psi_{kn} = \left(\sum_{l=1}^{N_{tx}} \frac{\mu_{ln}}{q_l} Q_{lk} + \sum_{n=1}^{N_{ue}} \frac{\lambda_{in}}{\sigma_i^2} h_i h_i^H\right) \quad (9)$$

$$\gamma_{kn} = \frac{\lambda_{kn}}{\sigma_k^2} h_k^H \left(\Psi_{kn} - \frac{\lambda_{kn}}{\sigma_k^2} h_k h_k^H\right)^+ h_k \quad (10)$$

$$\sum_{i=1}^{N_{ue}} \lambda_{in} = 1, \forall n \in Ptn \quad (11)$$

$$\sum_{l=1}^{N_{tx}} \mu_{ln} = 1, \forall n \in Ptn \quad (12)$$

$$\sum_{n=1}^{N_{pat}} f_n = 1, \forall n \in Ptn \quad (13)$$

$\lambda_{in}$ indicates a variable corresponding to a power ratio allocated to transmission data for a user i in the pattern n, $\mu_{ln}$ indicates a condition related to a transmission power condition, and $q_l$ indicates transmission power at a transmission point 1.

Maximization of U indicated in Expression (7) for $\lambda_{in}$, $\mu_{ln}$ and $f_n$ may be similar to the PF utility optimization problem represented by Expressions (2) to (6).

A relationship represented by Expressions (14) and (15) below is illustratively established between $\lambda_{in}$, $\mu_{ln}$ and the transmission weight $v_{in}$.

$$v_{kn} = \sqrt{p_{kn}} \, \bar{v}_{kn}, \, \bar{v}_{kn} = \frac{\Psi_{kn}^+ h_k}{|\Psi_{kn}^+ h_k|} \quad (14)$$

$$(p_{1n} \ \ldots \ p_{kn} \ \ldots) = (\gamma_{1n}\sigma_1 \ \ldots \ \gamma_{kn}\sigma_k \ \ldots)M_n^+ \quad (15)$$

$$M_n = [M_n]_{ik} = \begin{cases} |h_i^H v_{in}|^2 & i = k \\ -\gamma_{kn}|h_k^H v_{in}|^2 & i \neq k \end{cases}$$

The number of variables of the PF utility optimization problem represented by Expressions (7) to (13) is illustratively (the number of users+the number of transmission points+1)×the number of transmission patterns. On the other hand, the number of variables of the PF utility optimization problem represented by Expressions (2) to (6) is illustratively (the number of users×the number of transmission points)×the number of transmission patterns×2+the number of transmission patterns. Therefore, the number of variables of the PF utility optimization problem represented by Expressions (7) to (13) is less than the number of variables of the PF utility optimization problem represented by Expressions (2) to (6).

Note that a method for solving the PF utility optimization problem is not limited and variable known methods may be used. For example, as a method for solving the PF utility optimization problem, a method described in M. J. D. Powell, "A view of algorithms for optimization without derivatives," Cambridge University Technical Report DAMTP 2007, April, 2007, may be used.

$\lambda_{in}$ obtained by PF utility optimization represented by Expressions (7) to (13) indicates that, as the value provided for a user in each transmission pattern increases, transmission power allocated to the user in multiplexing data increases. Therefore, user determination may be illustratively performed based on Expression (16) using a threshold $Th_{mux}$ used for selecting a user the value of $\lambda_{in}$ of which is large.

$$UE_q = \{p_{mux}|\lambda_{pq} \geq Th_{mux}\}, \forall q \in Ptn \quad (16)$$

$UE_q$ indicates a set of users that are to be multiplexed in a transmission pattern q, and indicates that $\lambda_{pq}$ is calculated for each transmission pattern to select, as a user that is to be multiplexed, a user, $\lambda_{pq}$ of which is a threshold or more.

The transmission weight determination unit 113 may be configured to follow a change in propagation path characteristic between the transmission point 2 and the terminal 3 and thus update the transmission weight. Expression (17) illustratively indicates that a change amount Δh (t–t₀) of the propagation path characteristic in a zone between a time t₀ to t.

$$\Delta h(t - t_0) = \sum_{i=1}^{N_{ue}} |h_i(t) - h_i(t_0)| \quad (17)$$

$h_i(t)$ indicates a propagation vector at the time t for the user i. For example, Δh (t–t₀) may be an amount obtained by adding up absolute values of change amounts of respective propagation vectors of users. Then, when the calculated change amount is the threshold $Th_{prop}$ or more, the transmission weight determination unit 113 may be configured to recalculate (in another word, "update") the transmission weight.

Although the user that is to be multiplexed changes as the transmission weight changes due to a change in propagation vector, the user that is to be multiplexed does not change before a value related to transmission power that is allocated to transmission data for each terminal 3 exceeds a threshold. On the other hand, the transmission weight changes even due to a small change in propagation vector.

Therefore, if an index related to transmission power is a threshold or less, the transmission weight determination unit 113 may be configured to update the transmission weight in accordance with a change in propagation characteristic estimated by the channel estimation unit 111. In other words, the transmission weight that follows the propagation path change to a certain extent may be determined by reflecting only a propagation path change for calculation of the transmission weight without updating the value of λ used for determining the transmission weight. In this case, the scheduler 114 may be configured to acquire the latest propagation vector from the channel estimation unit 111 and calculate an instantaneous throughput, based on the updated transmission weight, and thereby calculate a PF metric. Thus, a transmission weight that is allocated to each transmission pattern may be properly set.

Note that, even in the process of calculation of the transmission weight or λ used for determining the transmission weight by PF utility maximization, the transmission weight determination unit 113 may be configured to determine a user that is to be multiplexed from λ that is being calculated. Then, the transmission weight determination unit 113 may be configured to recalculate an optimal transmission weight from λ that is being calculated in accordance with a change in propagation characteristic estimated by the channel estimation unit 111. Thus, a time which it takes to generate a transmission signal may be reduced.

The transmission weight determination unit 113 may be configured to perform calculation of the transmission pattern and the variable λ in a predetermined time T millisecond (ms). Then, when the predetermined time T (ms) has elapsed, the transmission weight determination unit 113 may be configured to stop calculation of the transmission pattern and the variable λ. In this case, the scheduler 114 may be configured to perform transmission pattern selection, based on the transmission pattern and the variable λ (in other words, "a halfway result of PF utility optimization") calculated by the transmission weight determination unit 113 in the predetermined time T (ms).

Information related to the predetermined time T may be stored, for example, in the RAM (not illustrated) of the memory 12.

The scheduler 114 illustratively determines a transmission pattern that is applied to the transmission signal from the plurality of transmission patterns determined by the transmission weight determination unit 113 and thereby performs scheduling. The scheduler 114 may be configured to acquire the transmission weight $v_{kn}$ and information related to λ and μ from the transmission weight determination unit 113 and thereby calculate the PF metric from the acquired information. Then, the scheduler 114 may be configured to select a transmission weight that is applied to the transmission signal from the plurality of transmission weights, based on the calculated PF metric. Information acquired by the scheduler 114 from the transmission weight determination unit 113 may include information related to a user that is to be multiplexed.

Figure 4:
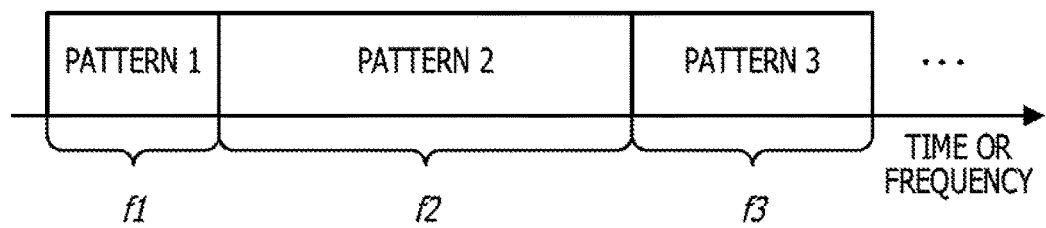
FIG. 4 is a diagram illustrating a resource ratio in the communication system according to the embodiment.

FIG. 4 is a diagram illustrating a resource ratio in the communication system according to the embodiment.

In FIG. 4, an example in which the transmission pattern n (n=1, 2, 3, . . . ) occupies a time or a frequency at $f_n$=$f_1$, $f_2$, $f_3$, . . . is illustrated. In other words, in FIG. 4, a ratio to the whole, at which each transmission pattern is selected in the process of scheduling.

The scheduler 114 may be configured to perform scheduling each time a scheduling cycle $f_n$ has elapsed. In other words, the scheduler 114 may be configured to perform transmission pattern selection in the scheduling cycle using the transmission weight $v_{kn}$ and multi-user information $UE_q$.

The scheduler 114 may be configured to select a transmission pattern with which a post-scheduling throughput is estimated to be high, based on a solution to the PF utility optimization problem represented by Expressions (2) to (6) or Expressions (7) to (13) above.

In the above-described PF utility optimization problem, as a result of scheduling, a variable $f_n$ indicating a ratio at which the transmission pattern n is used is calculated. The scheduler 114 may be configured to exclude, if the variable $f_n$ is less than the threshold $Th_{pat}$, the transmission pattern n from selection candidates. Thus, frequent switching of the transmission pattern is not caused to occur and power consumption in the communication system 100 may be reduced.

The scheduler 114 may be configured to perform, at a different transmission opportunity, transmission pattern selection such that the ratio of a resource that is allocated to transmission data that is transmitted in the corresponding transmission pattern is averaged. Thus, a fair allocation opportunity of a wireless resource between a plurality of users may be achieved.

The scheduler 114 may be configured to calculate, when an optimal pattern $q_{max}$ (t) at the time t is selected from the plurality of transmission weights obtained by PF utility optimization, the PF metric related to each transmission pattern q, in the manner indicated by Expression (18) below. Then, the scheduler 114 may be configured to select the transmission pattern $q_{max}$ (t) with which the calculated PF metric is maximum from a transmission pattern set Ptn.

$$q_{max}(t) = \max_{q \in Ptn} \sum_{i=1}^{N_{ue}} \frac{R_{iq}}{\overline{R}_i(t-1)} \quad (18)$$

$\overline{R}_i(t)$ indicates an average throughput of the user i at the time t and may be updated for each scheduling, using a forgetting factor β indicated in Expression (19) below and an instantaneous throughput $R_i$ (t).

$$\tilde{R}_i(t) = \beta \tilde{R}_i(t-1) + (1-\beta) R_i(t) \quad (19)$$

From a group of the terminals 3 an index of which is larger than a threshold, the index being related to power that is allocated to transmission data for each terminal 3, the scheduler 114 may be configured to select as data transmission targets a predetermined number of terminals 3 in a descending order of the value of the index from the largest value. In other words, the scheduler 114 may be configured to select users of the number of multiplexes $N_{mux}$ in a descending order of the value of $\lambda_{kq}$, which is λ of the user k, from the largest value, and set the selected users as users that are to be multiplexed in the pattern q. Thus, a user that is allocated to each transmission pattern may be properly selected.

The transmission signal generation unit 115 may be illustratively configured to generate a transmission signal, based on the transmission weight notified from the scheduler 114 and information (may be also referred to as "multi-user information") that indicates a user that is to be multiplexed.

Transmission signal data at the time t, which is expressed by $x'(t) \in C^{N_{Tx}} \times C$ may be generated in accordance with Expression (20) below, based on the transmission pattern number $q_{max}$ (t) used at the time t, which has been calculated by Expression (18) above.

$$x'(t) = \sum_{i \in UE_{qmax}(t)} v_{iqmax}(t) x_i(t) \quad (20)$$

The propagation path change detection unit 112, the transmission weight determination unit 113, and the scheduler 114 may be configured to function as an example of a control unit. The control unit may be illustratively configured to select, based on the propagation characteristic estimated by an estimation unit 111, one of the plurality of transmission patterns indicated by the plurality of terminals 3 that are selected as data transmission targets at a certain transmission opportunity and the weighting factor that is applied to transmission data for each data transmission target. Thus, the processing amount for determining a combination of users that are to be multiplexed and a transmission weight may be reduced.

[A-2] Operation Example

Figure 5:
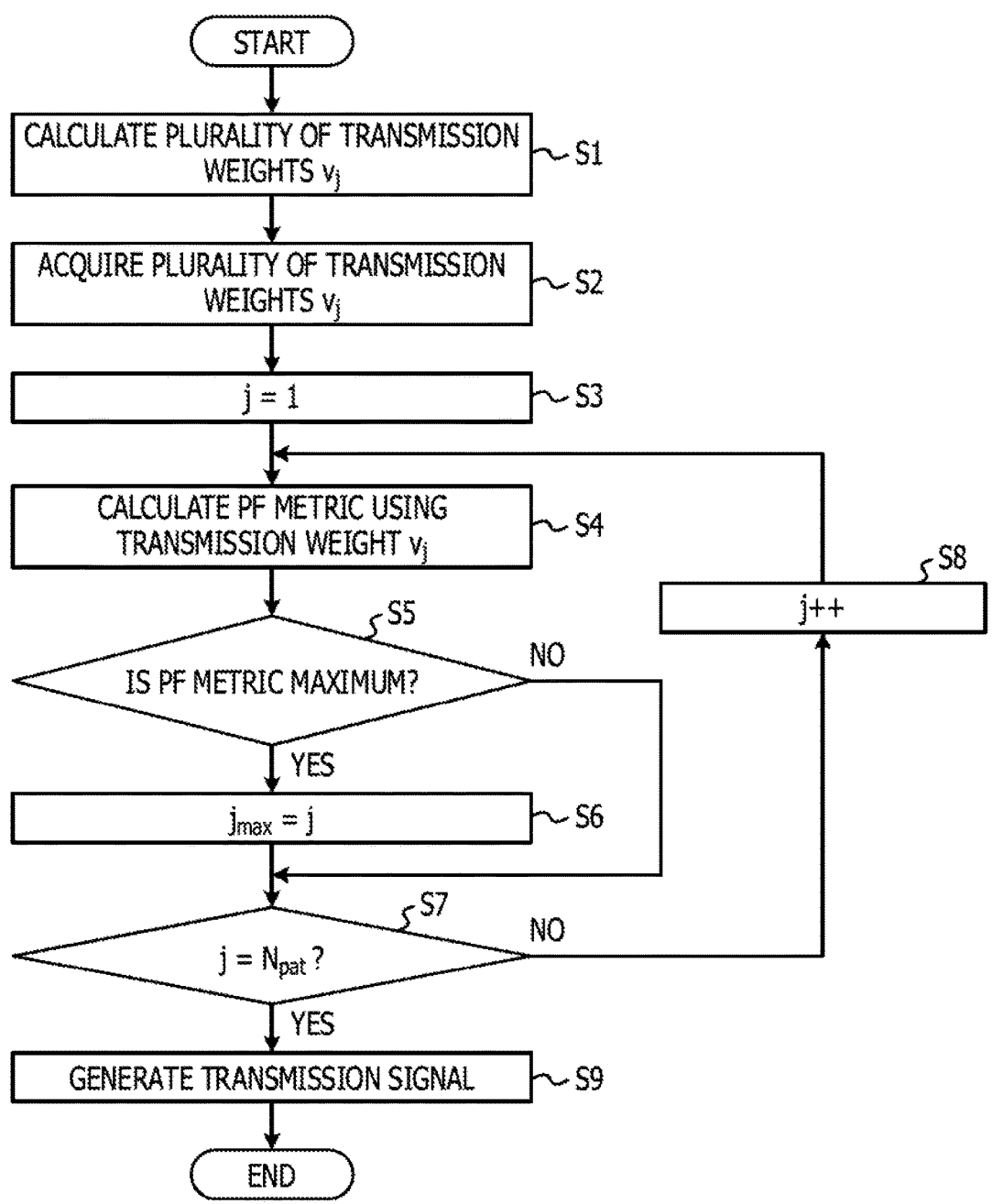
FIG. 5 is a flowchart illustrating an example of wireless resource scheduling in the communication system according to the embodiment.

An example of wireless resource scheduling in the communication system 100 according to the embodiment, which is configured in the above-described manner, will be described in accordance with a flowchart (Steps S1 to S9) illustrated in FIG. 5.

The transmission weight determination unit 113 calculates a plurality of transmission weights $v_j$ in accordance with a change in propagation characteristic estimated by the channel estimation unit 111 (Step S1).

The scheduler 114 acquires the plurality of transmission weights $v_3$ calculated by the transmission weight determination unit 113 (Step S2).

The scheduler 114 sets a variable j to 1 (Step S3).

The scheduler 114 calculates a PF metric using the transmission weight $v_j$ (Step S4).

The scheduler 114 determines whether or not the PF metric for the transmission weight $v_j$ is maximum (Step S5).

If the PF metric is not maximum (see a NO route in Step S5), the process proceeds to Step S7.

On the other hand, if the PF metric is maximum (see a YES route in Step S5), the scheduler 114 sets the variable j to $j_{max}$ indicating the variable j with which the PF metric is maximum (Step S6).

The scheduler 114 determines whether or not the variable j is equal to the number of transmission patterns $N_{pat}$ (Step S7).

If the variable j is not equal to the number of transmission patterns $N_{pat}$ (see a NO route in Step S7), the scheduler 114 increments the variable j by one (Step S8), and the process returns to Step S4.

On the other hand, if the variable j is equal to the number of patterns $N_{pat}$ (see a YES route in Step S7), the transmission signal generation unit 115 generates a transmission signal, based on the transmission weight $v_j$ when $j=j_{max}$ (Step S9). Then, the process ends.

Figure 6:
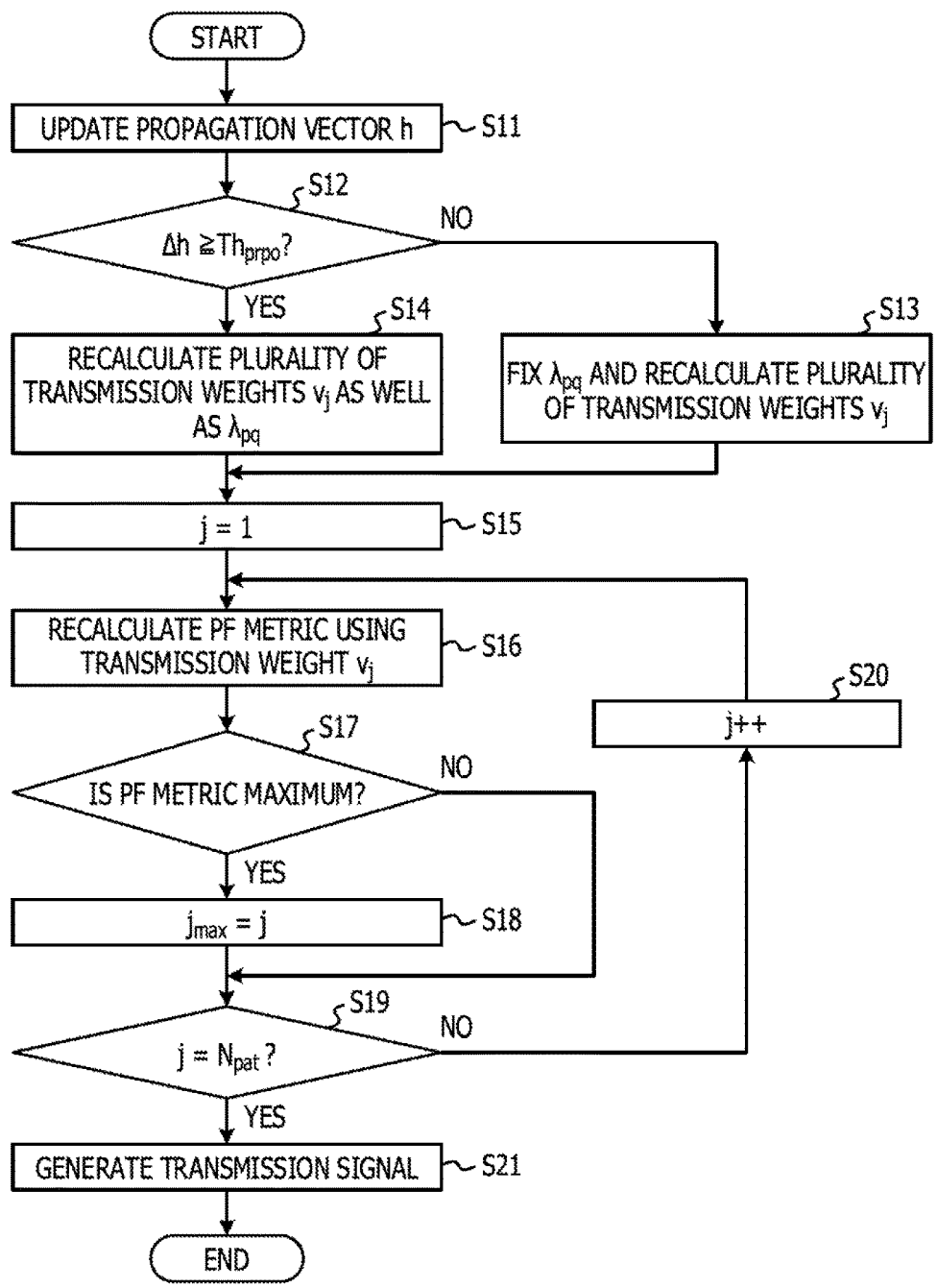
FIG. 6 is a flowchart illustrating an example of transmission weight recalculation in the communication system according to the embodiment.

Next, an example of transmission weight recalculation in the communication system 100 according to the embodiment will be described with reference to a flowchart (Steps S11 to S21) illustrated in FIG. 6.

The channel estimation unit 111 updates a propagation vector h (Step S11).

The propagation path change detection unit 112 determines whether or not a variation amount Δh of the propagation vector h is a threshold $Th_{prop}$ or more (Step S12).

If Δh is less than the threshold $Th_{prop}$ (see a NO route in Step S12), the transmission weight determination unit 113 fixes a transmission power ratio $\lambda_{pq}$ and recalculates the plurality of transmission vectors $v_j$ (Step S13). Then, the process proceeds to Step S15.

On the other hand, if Δh is the threshold $Th_{prop}$ or more (see a YES route in Step S12), the transmission weight determination unit 113 recalculates the plurality of transmission vectors $v_j$ as well as the transmission power ratio $\lambda_{pq}$ (Step S14).

The scheduler 114 sets the variable j to 1 (Step S15).

The scheduler 114 calculates the PF metric using the transmission weight $v_j$ (Step S16).

The scheduler 114 determines whether or not the PF metric for the transmission weight $v_j$ is maximum (Step S17).

If the PF metric is not maximum (see a NO route in Step S17), the process proceeds to Step S19.

On the other hand, if the PF metric is maximum (see a YES route in Step S17), the scheduler 114 sets the variable j to $j_{max}$ indicating the variable j with which the PF metric is maximum (Step S18).

The scheduler 114 determines whether or not the variable j is equal to the number of transmission patterns $N_{pat}$ (Step S19).

If the variable j is not equal to the number of transmission patterns $N_{pat}$ (see a NO route in Step S19), the scheduler 114 increments the variable j by one (Step S20), and the process returns to Step S16.

On the other hand, if the variable j is equal to the number of patterns $N_{pat}$ (see a YES route in Step S19), the transmission signal generation unit 115 generates a transmission signal, based on the transmission weight $v_j$ when $j=j_{max}$ (Step S21). Then, the process ends.

Figure 7:
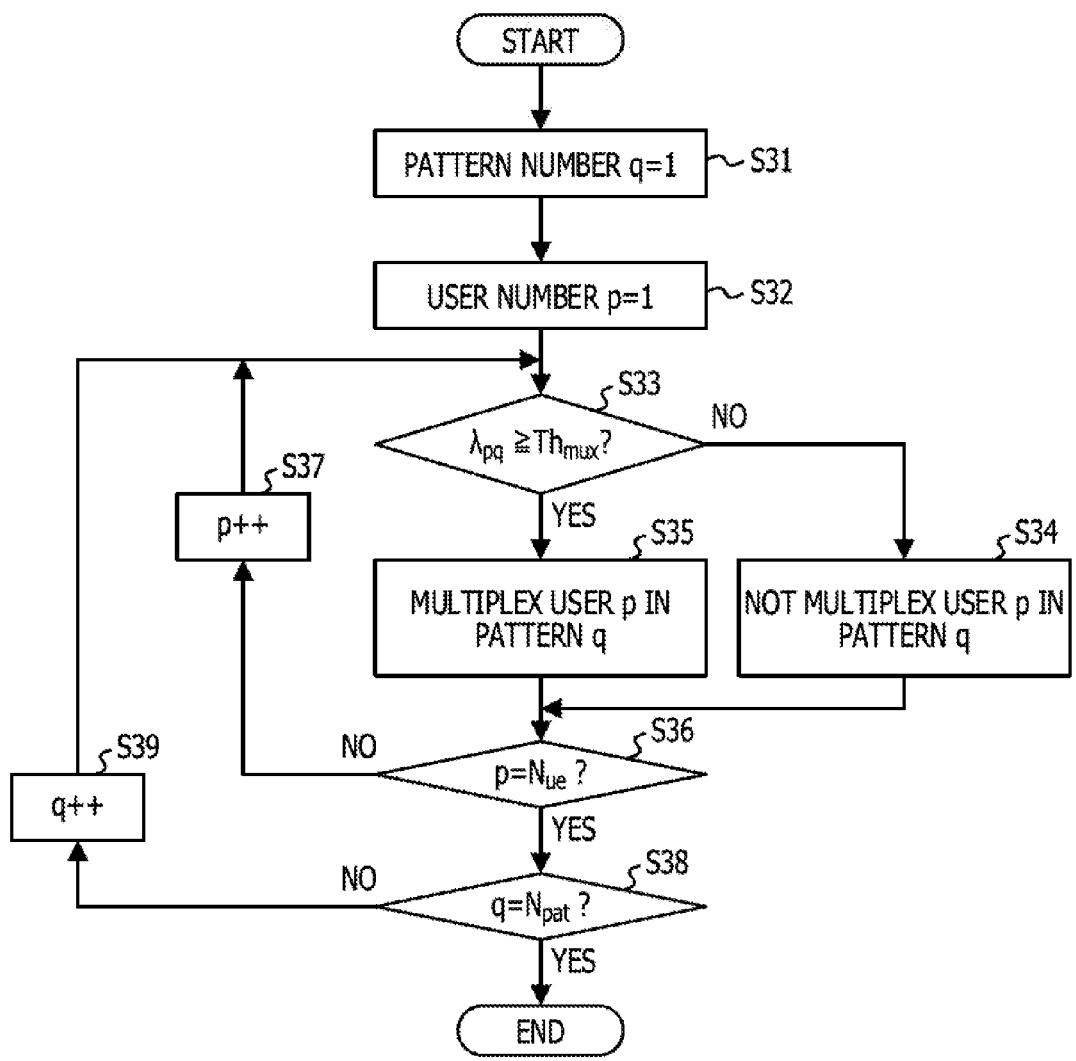
FIG. 7 is a flowchart illustrating a first example of determination of a terminal that is to be multiplexed based on allocated power of the terminal in the communication system according to the embodiment.

Next, a first example of determination of the terminal 3 that is to be multiplexed based on allocated power of the terminal 3 in the communication system 100 according to the embodiment will be described with reference to a flowchart (Steps S31 to S39) illustrated in FIG. 7. In FIG. 7, an operation example that is performed when a user the transmission power ratio $\lambda_{pq}$ of which is the threshold or more is a user that is to be multiplexed.

The scheduler 114 sets a variable q for a transmission pattern number to 1 (Step S31).

The scheduler 114 sets a variable p for a user number to 1 (Step S32).

The scheduler 114 determines whether or not the transmission power ratio $\lambda_{pq}$ is a threshold $Th_{mux}$ or more (Step S33).

If the transmission power ratio $\lambda_{pq}$ is less than the threshold $Th_{mux}$ (see a NO route in Step S33), the scheduler 114 does not multiplex a user p in a transmission pattern q (Step S34). Then, the process proceeds to Step S36.

On the other hand, if the transmission power ratio $\lambda_{pq}$ is the threshold $Th_{mux}$ or more (see a YES route in Step S33), the scheduler 114 multiplexes the user p in the transmission pattern q (Step S35).

The scheduler 114 determines whether or not the variable p is equal to the number of users $N_{ue}$ (Step S36).

If the variable p is not equal to the number of users $N_{ue}$ (see a NO route in Step S36), the scheduler 114 increments the variable p by one (Step S37), and the process returns to Step S33.

On the other hand, if the variable p is equal to the number of users $N_{ue}$ (see a YES route in Step S36), the scheduler 114 determines whether or not the variable q is equal to the number of transmission patterns $N_{pat}$ (Step S38).

If the variable q is not equal to the number of transmission patterns $N_{pat}$ (see a NO route in Step S38), the scheduler 114 increments the variable q by one (Step S39), and the process returns to Step S33.

On the other hand, if the variable q is equal to the number of transmission patterns $N_{pat}$ (see a YES route in Step S38), the process ends.

Figure 8:
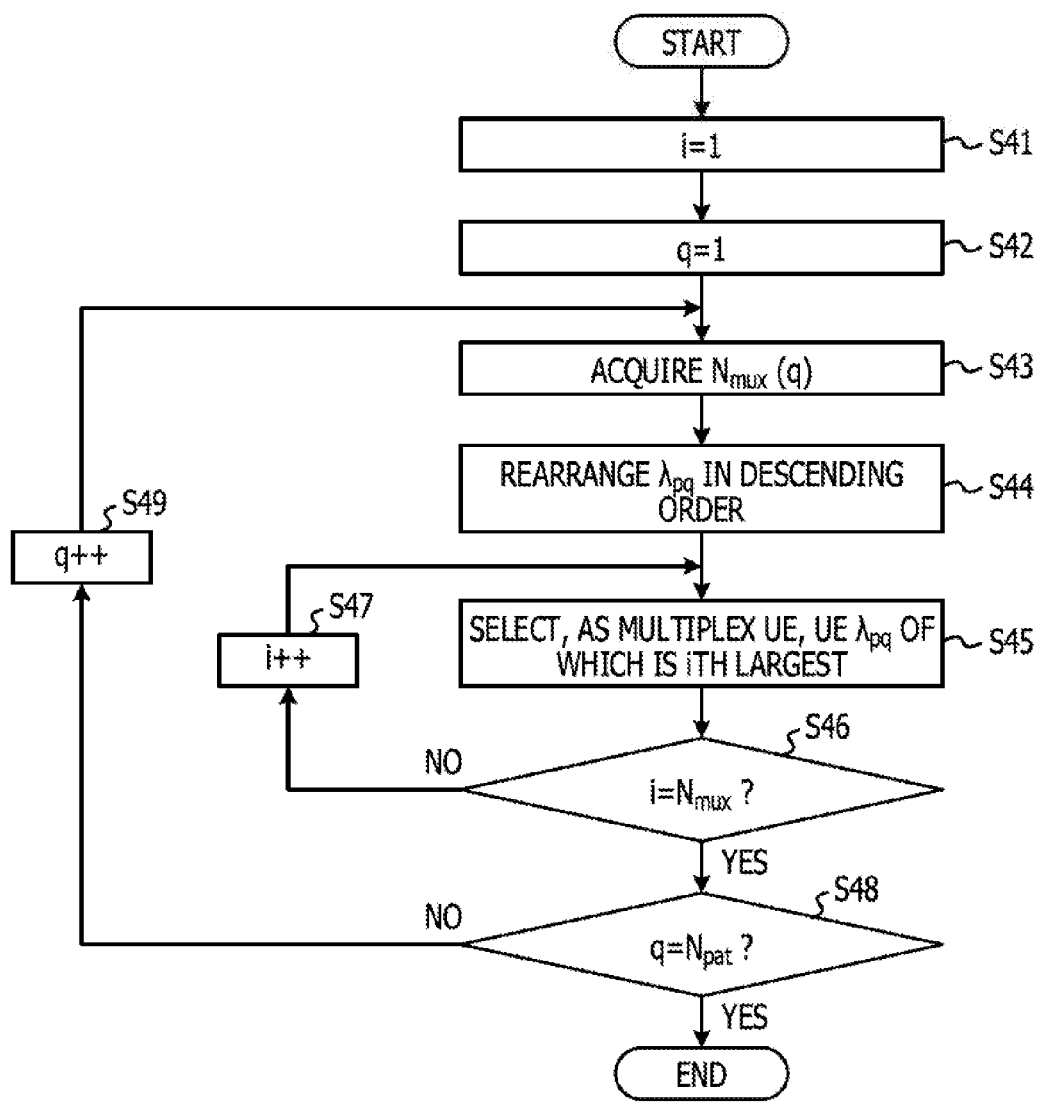
FIG. 8 is a flowchart illustrating a second example of determination of a terminal that is to be multiplexed based on allocated power of the terminal in the communication system according to the embodiment.

Next, a second example of determination of the terminal 3 that is to be multiplexed based on the allocated power of the terminal 3 in the communication system 100 according to the embodiment will be described with reference to a flowchart (Steps S41 to S49) illustrated in FIG. 8. In FIG. 8, an operation example of selection of a user that is to be multiplexed based on the priority order of the user in consideration of the magnitude of the transmission power ratio $\lambda_{pq}$ is illustrated.

The scheduler 114 sets a variable i for the number of a user that is to be multiplexed to 1 (Step S41).

The scheduler 114 sets the variable q for the transmission pattern number to 1 (Step S42).

The scheduler 114 acquires $N_{mux}(q)$ indicating the number of multiplexes for the transmission pattern q (Step S43).

Information related to $N_{mux}$ (q) may be stored, for example, in the RAM (not illustrated) of the memory 12 and the transmission weight determination unit 113 may be configured to acquire information related to $N_{mux}$ (q) from the RAM. $N_{mux}$ (q) may be a common value for the plurality of transmission patterns q and may be a different value for each of the plurality of transmission patterns q.

The scheduler 114 rearranges the transmission power ratio $\lambda_{pq}$ in a descending order (Step S44).

The scheduler 114 selects, as the terminal 3 that is to be multiplexed, the terminal 3 the transmission power ratio $\lambda_{pq}$ of which is the ith largest (Step S45).

The scheduler 114 determines whether or not the variable i is equal to the number of multiplexes $N_{mux}$ (Step S46).

If the variable i is not equal to the number of multiplexes $N_{mux}$ (see a NO route in Step S46), the scheduler 114 increments the variable i by one (Step S47), and the process returns to Step S45.

On the other hand, the variable i is equal to the number of multiplexes $N_{mux}$ (see a YES route in Step S46), the scheduler 114 determines whether or not the variable q is equal to the number of transmission patterns $N_{pat}$ (Step S48).

If the variable q is not equal to the number of transmission patterns $N_{pat}$ (see a NO route in Step S48), the scheduler 114 increments the variable q by one (Step S49), and the process returns to Step S43.

On the other hand, if the variable q is equal to the number of transmission patterns $N_{pat}$ (see a YES route in Step S48), the process ends.

Figure 9:
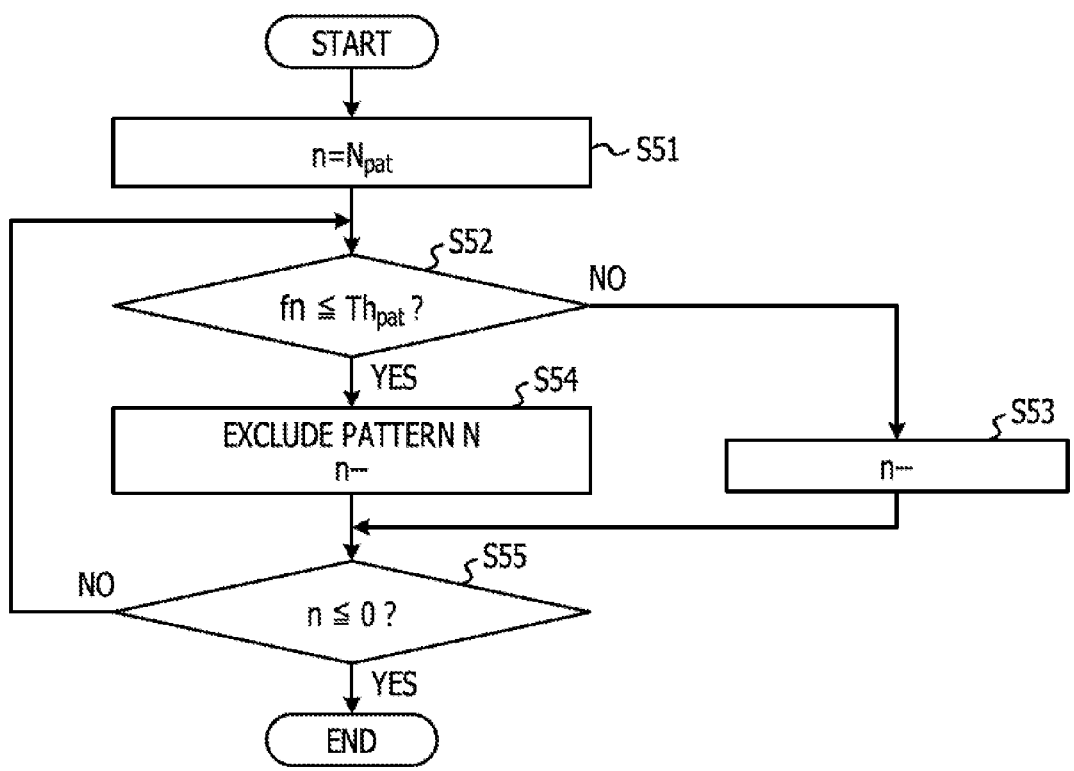
FIG. 9 is a flowchart illustrating an example of determination of a terminal that is to be multiplexed based on a resource ratio in the communication system according to the embodiment.

Next, an example of determination of the terminal 3 that is to be multiplexed based on a resource ratio in the communication system 100 according to the embodiment will be described in accordance with a flowchart (Steps S51 to S55) illustrated in FIG. 9.

The scheduler 114 sets the variable n to the number of transmission patterns $N_{pat}$ (Step S51).

The scheduler 114 determines whether or not $f_n$ indicating the ratio of a resource occupied by the transmission pattern n is the threshold $Th_{pat}$ or less (Step S52).

If $f_n$ indicating the ratio of a resource occupied by the transmission pattern n is more than the threshold $Th_{pat}$ (see a NO route in Step S52), the scheduler 114 decrements the variable n by one (Step S53).

On the other hand, if $f_n$ indicating the ratio of a resource occupied by the transmission pattern n is the threshold $Th_{pat}$ or less (see a YES route in Step S52), the scheduler 114 excludes the transmission pattern n from the selection candidates and decrements the variable by one (Step S54).

The scheduler 114 determines whether or not the variable n is 0 or less (Step S55).

If the variable n is more than 0 (see a NO route in Step S55), the process returns to Step S52.

On the other hand, if the variable n is 0 or less (see a YES route in Step S55), the process ends.

Figure 10:
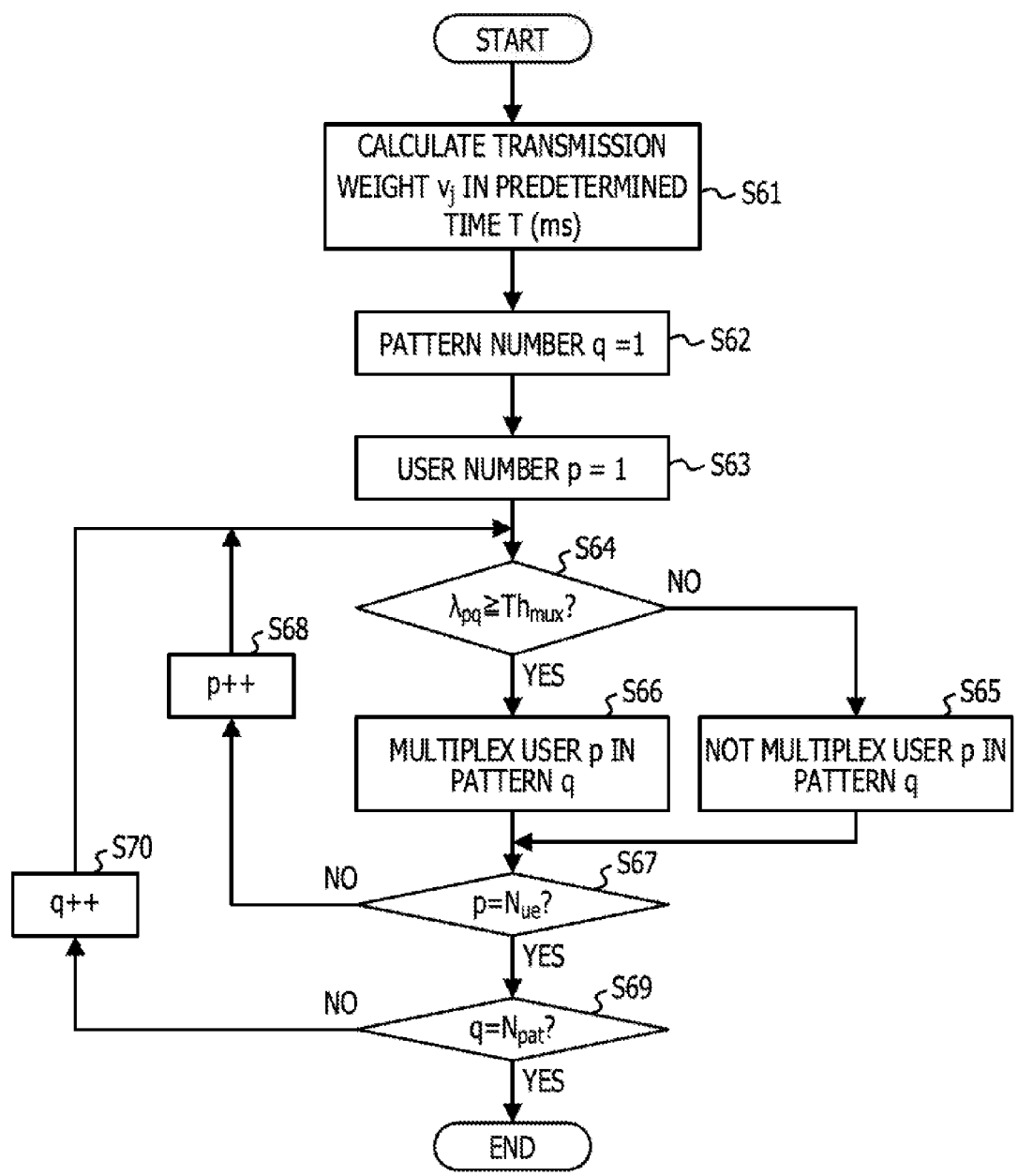
FIG. 10 is a flowchart illustrating an example of PF utility optimization in a predetermined time in the communication system according to the embodiment.

Next, an example of PF utility optimization in a predetermined time in the communication system according to the embodiment will be described in accordance with a flowchart (Steps S61 to S70) illustrated in FIG. 10.

The transmission weight determination unit 113 calculates the transmission weight $v_j$ in the predetermined time T (ms) (Step S61).

The scheduler 114 sets the variable q for the transmission pattern number to 1 (Step S62).

The scheduler 114 sets the variable p for the user number to 1 (Step S63).

The scheduler 114 determines whether or not the transmission power ratio $\lambda_{pq}$ is the threshold $Th_{mux}$ or more (Step S64).

If the transmission power ratio $\lambda_{pq}$ is less than the threshold $Th_{mux}$ (see a NO route in Step S64), the scheduler 114 does not multiplex the user p in the transmission pattern q (Step S65). Then, the process proceeds to Step S67.

On the other hand, if the transmission power ratio $\lambda_{pq}$ is the threshold $Th_{mux}$ or more (see a YES route in Step S64), the scheduler 114 multiplexes the user p in the transmission pattern q (Step S66).

The scheduler 114 determines whether or not the variable p is equal to the number of users $N_{ue}$ (Step S67).

If the variable p is not equal to the number of users $N_{ue}$ (see a NO route in Step S67), the scheduler 114 increments the variable p by one (Step S68), and the process returns Step S64.

On the other hand, if the variable p is equal to the number of users $N_{ue}$ (see a YES route in Step S67), the scheduler 114 determines whether or not the variable q is equal to the number of transmission patterns $N_{pat}$ (Step S69).

If the variable q is not equal to the number of transmission patterns $N_{pat}$ (see a NO route in Step S69), the scheduler 114 increments the variable q by one (Step S70), and the process returns to Step S64.

On the other hand, if the variable q is equal to the number of transmission patterns $N_{pat}$ (see a YES route in Step S69), the process ends.

Next, an example of wireless resource scheduling in the communication system according to related art will be described in accordance with a flowchart (Steps S81 to S89) illustrated in FIG. 11.

The variable j indicating a user combination number is set to 1 (Step S81).

A user is selected (Step S82).

The transmission weight $v_j$ in the user combination j is calculated (Step S83).

The PF metric is calculated using the transmission weight $v_j$ (Step S84).

Whether or not the PF metric in the transmission weight $v_3$ is maximum is determined (Step S85).

If the PF metric is not maximum (see a NO route in Step S85), the process proceeds to Step S87.

On the other hand, if the PF metric is maximum (see a YES route in Step S85), the variable j is set to $j_{max}$ indicating that the user combination number with which the PF metric is maximum (Step S86).

Whether or not the variable j is equal to the number of user combinations $N_{comb}$ is determined (Step S87).

If the variable j is not equal to the number of user combinations $N_{comb}$ (see a NO route in Step S87), the variable j is incremented by one (Step S88), the process returns to Step S82.

On the other hand, if the variable j is equal to the number of user combinations $N_{comb}$ (see a YES route in Step S87), a transmission signal is generated using the transmission weight $v_j$ when $j=j_{max}$ (Step S89).

Figure 11:
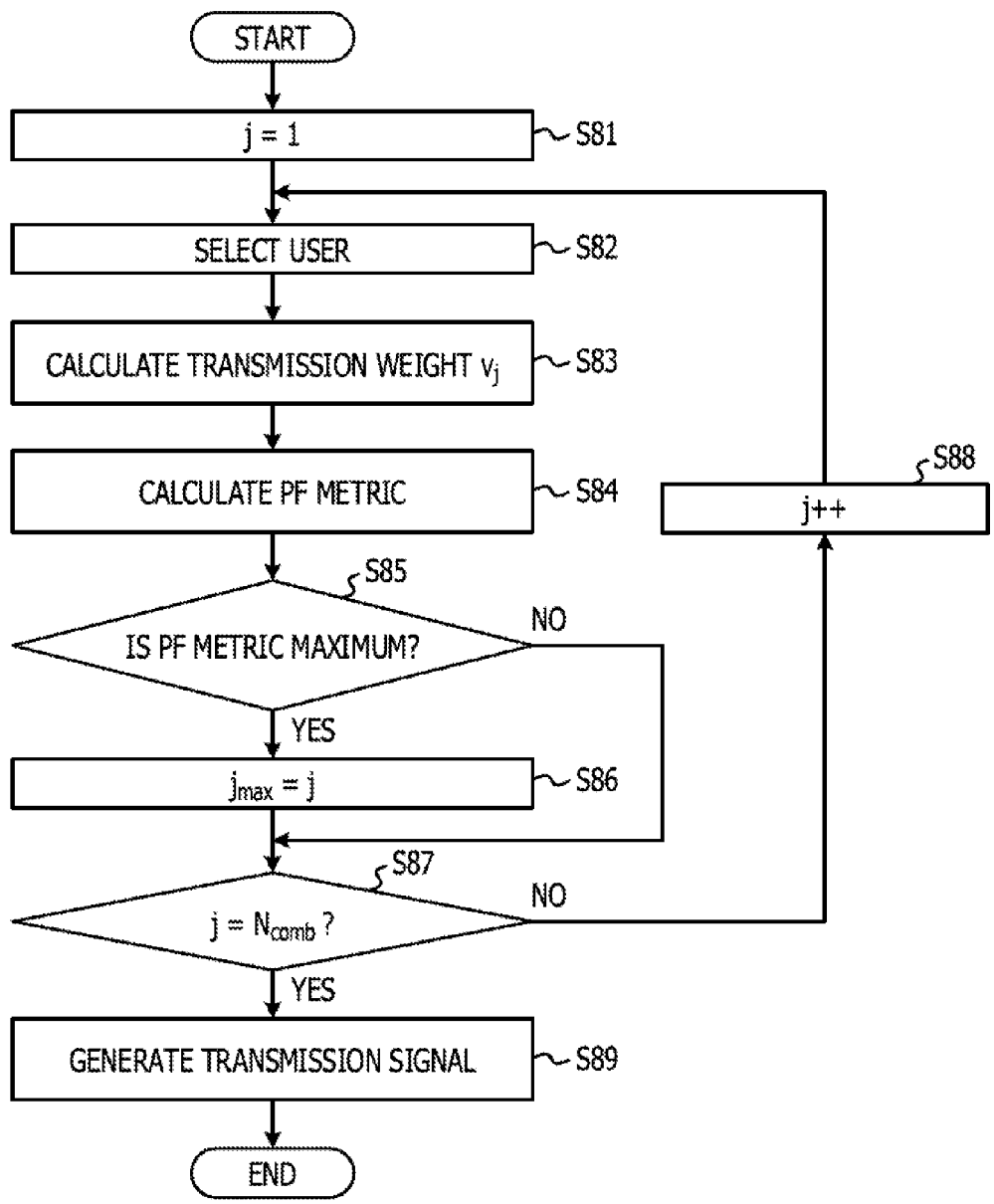
FIG. 11 is a flowchart illustrating an example of wireless resource scheduling in a communication system according to related art.

In the related art illustrated in FIG. 11, the combination of user multiplexing where the number of users is $N_{ue}$ and the multiplicity is $N_{tx}$ is $N_{comb}$ ($N_{ue}$, $N_{tx}$). For example, when $N_{ue}=14$ and $N_{tx}=5$, a combination of users that are to be multiplexed and a transmission weight are searched for from 2002 combinations. That is, in order to calculate the PF metric for all of combinations of user multiplexing, when $N_{ue}=14$ and $N_{tx}=5$, the processing of Step S82 to S88 illustrated in FIG. 11 is performed 2002 times and the processing time is enormous.

On the other hand, in this embodiment, a calculation of the PF metric using the transmission weight $v_j$ may be performed the number of times corresponding to the number of users at most, and also, may be performed the number of times which is less than the number of users. Thus, the processing time (in other words, a "processing amount") used for determining a combination of users that are to be multiplexed and the transmission weight may be reduced.

[B] Others

The technology disclosed herein is not limited to the embodiment described above and may be modified in various ways and thus implemented within the scope of the embodiment without departing from the gist thereof. Each configuration and each process of the embodiment may be chosen as appropriate or may be combined as appropriate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A base station comprising:
a memory;
a processor coupled to the memory and the processor configured to:
determine, less frequently than transmission opportunities, a specified number of transmission weight patterns based on first channel characteristics between the base station and each of a plurality of wireless terminals, each of the transmission weight patterns indicating transmission weights, which is to be used when the base station transmits a wireless signal to any of the plurality of the wireless terminals in one of the transmission opportunities,
select, for a target wireless terminal selected from the plurality of wireless terminals in each transmission opportunity of the transmission opportunities, a transmission weight pattern from the specified number of the transmission weight patterns based on second channel characteristics between the base station and the selected target wireless terminal, and
transmit the wireless signal based on the selected transmission weight pattern.

2. The base station according to claim 1,
wherein ratios of the transmission weight patterns are averaged in a time direction or a frequency direction.

3. The base station according to claim 1,
wherein the transmission weight pattern is selected from the specified number of the transmission weight patterns in a way that transmission powers for the target wireless terminals are larger than a first threshold respectively.

4. The base station according to claim 1,
wherein the transmission weight pattern is selected from the specified number of the transmission weight patterns in a way that an index indicating throughputs for the target wireless terminals is maximum.

5. The base station according to claim 1,
wherein the specified number of transmission weight patterns are determined when a change of the first channel characteristics between the base station and the plurality of wireless terminals is larger than a second threshold.

6. The base station according to claim 1,
wherein the specified number is smaller than a number of combinations of target wireless terminals from the plurality of wireless terminals.

7. A wireless communication system comprising:
a plurality of wireless terminals; and
a base station configured to:
determine, less frequently than transmission opportunities, a specified number of transmission weight patterns based on first channel characteristics between the base station and each of the plurality of wireless terminals, each of the transmission weight patterns indicating transmission weights which is to be used when the base station transmits a wireless signal to any of the plurality of the wireless terminals in one of the transmission opportunities,
select, for a target wireless terminal selected from the plurality of wireless terminals in each transmission opportunity of the transmission opportunities, a transmission weight pattern from the specified number of the transmission weight patterns based on second channel characteristics between the base station and the selected target wireless terminal, and
transmit the wireless signal based on the selected transmission weight pattern.

8. A wireless communication method comprising:
determining, less frequently than transmission opportunities, a specified number of transmission weight patterns based on first channel characteristics between a base station and each of a plurality of wireless terminals, each of the transmission weight patterns indicating transmission weights which is to be used when the base station transmits a wireless signal to any of the plurality of the wireless terminals in one of the transmission opportunities;
selecting, for a target wireless terminal selected from the plurality of the wireless terminals in each transmission opportunity of the transmission opportunities, a transmission weight pattern from the specified number of the transmission weight patterns based on second channel characteristics between the base station and the selected target wireless terminal; and
transmitting the wireless signal based on the selected transmission weight pattern.

* * * * *